March 14, 1950     H. F. WHITE     2,500,479
ROLLER CONTROL MECHANISM FOR DOUGH SHEETING TABLES Filed April 14, 1948     5 Sheets-Sheet 1

Inventor:
HOWARD F. WHITE
George R. Willcox
BY Attorney

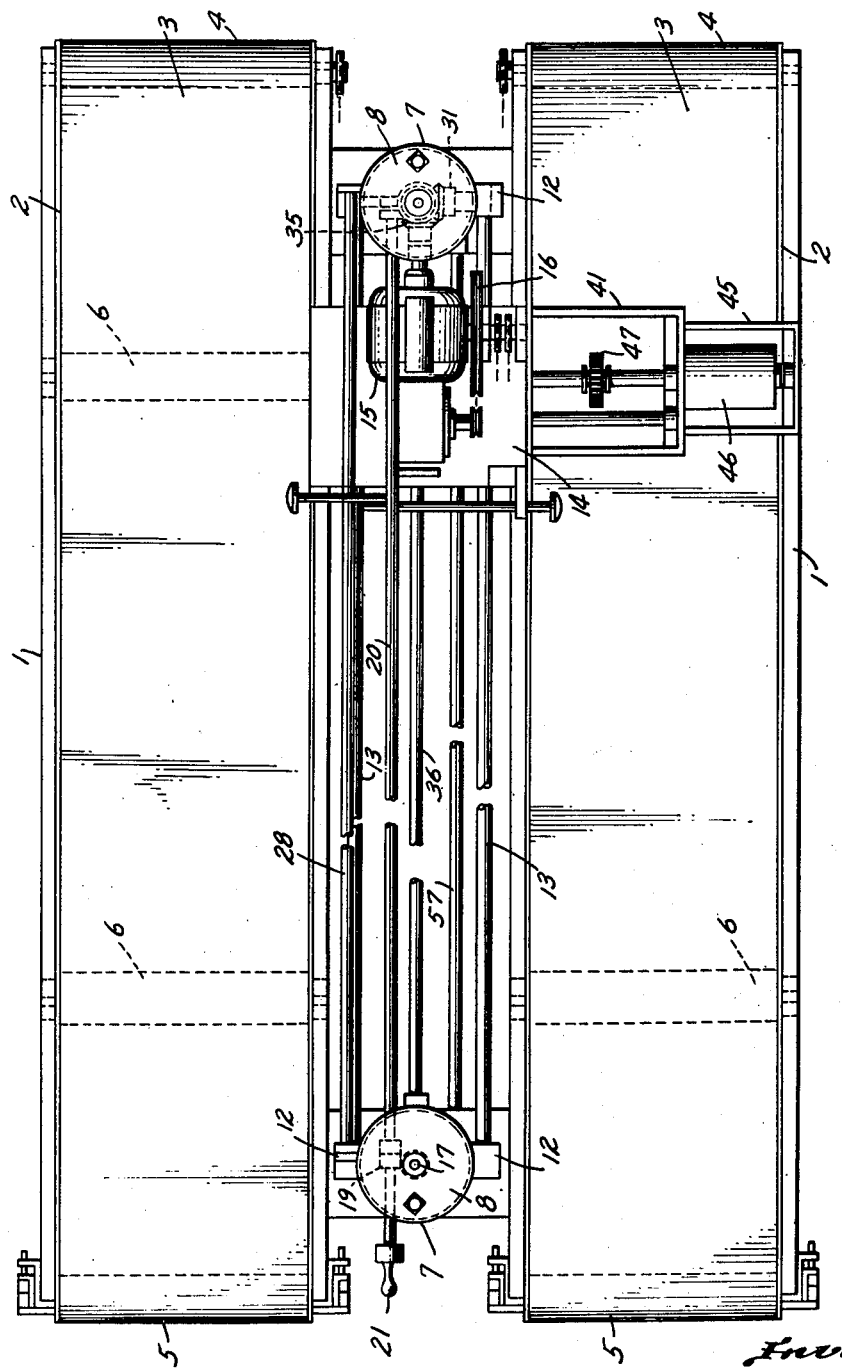

March 14, 1950 H. F. WHITE 2,500,479
ROLLER CONTROL MECHANISM FOR DOUGH SHEETING TABLES
Filed April 14, 1948 5 Sheets-Sheet 3
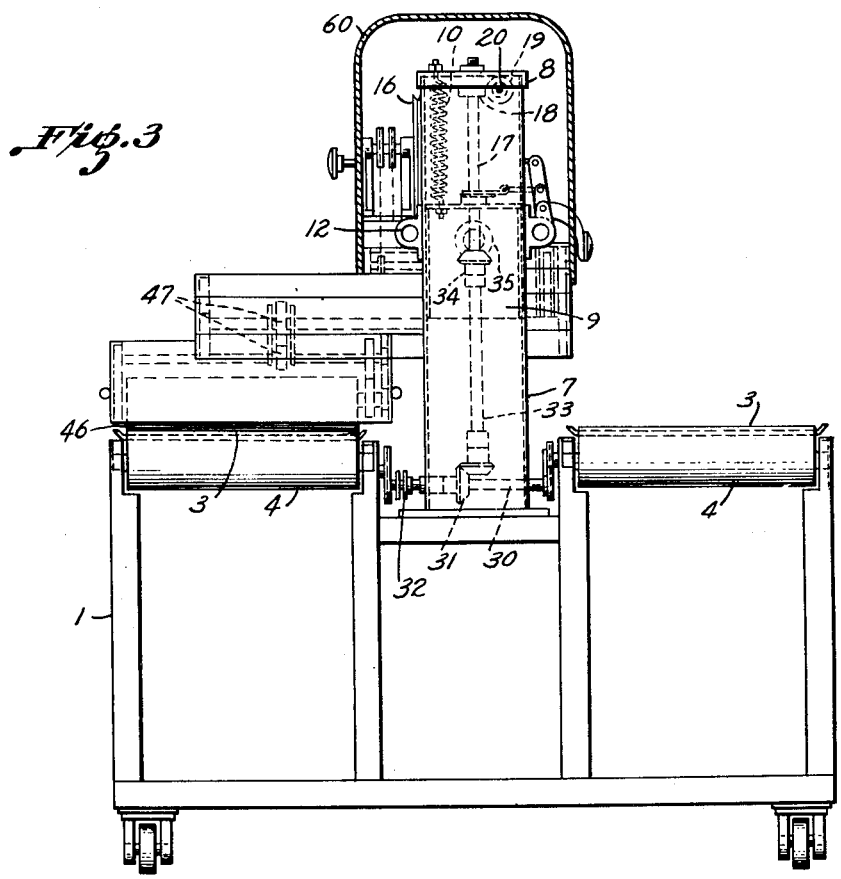
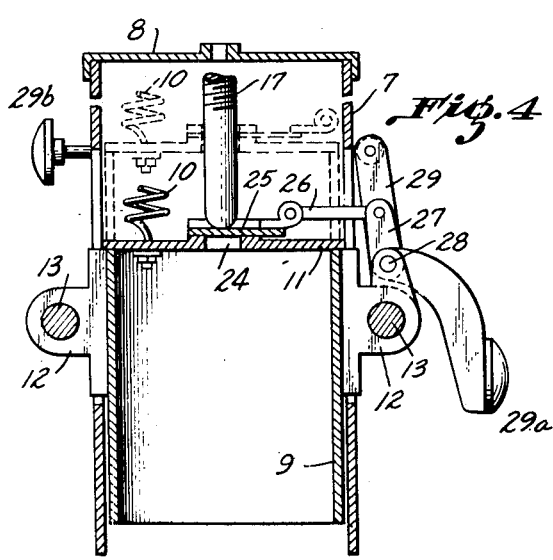
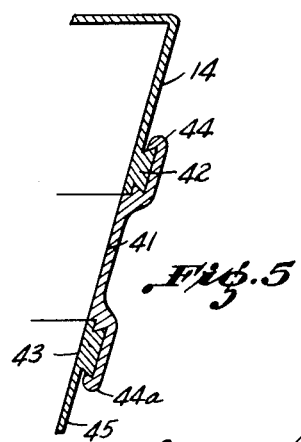
Inventor:
HOWARD F. WHITE
By George B. Willcox
Attorney March 14, 1950     H. F. WHITE     2,500,479
ROLLER CONTROL MECHANISM FOR DOUGH SHEETING TABLES
Filed April 14, 1948     5 Sheets-Sheet 4
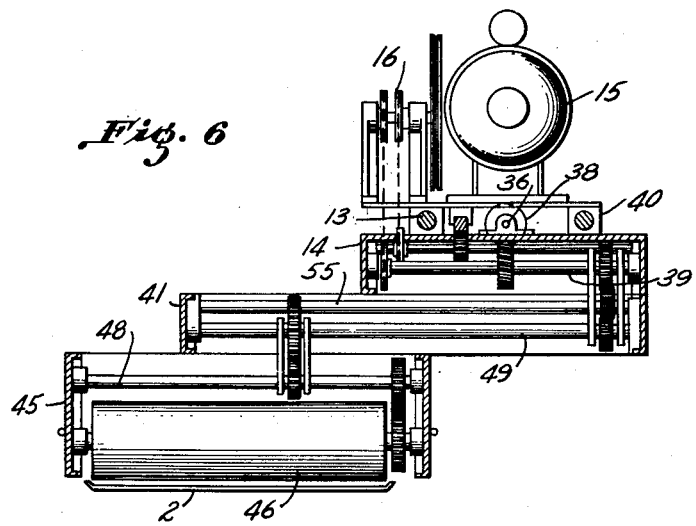
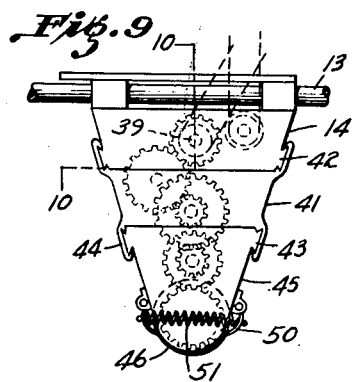
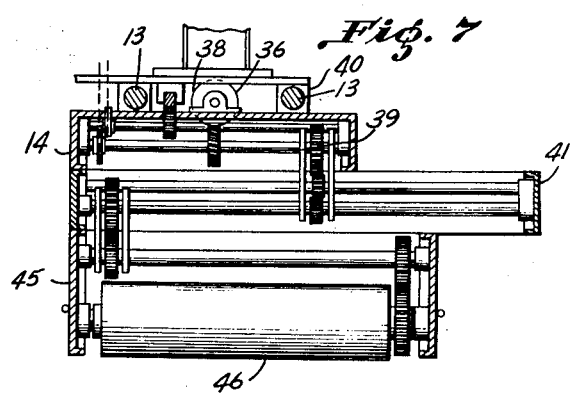
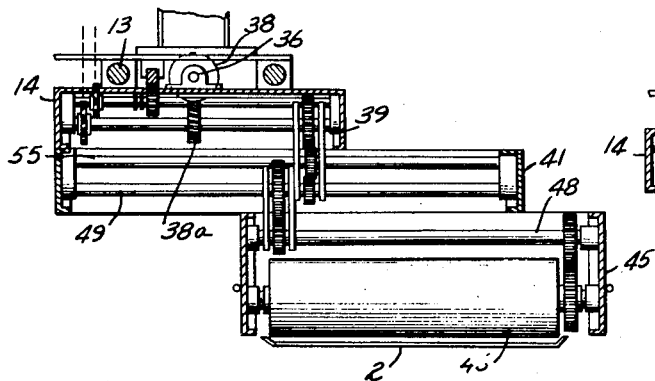
Inventor:
HOWARD F. WHITE March 14, 1950     H. F. WHITE     2,500,479
ROLLER CONTROL MECHANISM FOR DOUGH SHEETING TABLES
Filed April 14, 1948     5 Sheets-Sheet 5

Inventor:
HOWARD F. WHITE
By George B. Willcox
Attorney

Patented Mar. 14, 1950

2,500,479

UNITED STATES PATENT OFFICE 2,500,479

ROLLER CONTROL MECHANISM FOR DOUGH SHEETING TABLES

Howard F. White, Owosso, Mich.

Application April 14, 1948, Serial No. 20,945

2 Claims. (Cl. 107—12)

This invention relates to dough sheeting or rolling apparatus wherein dough pieces can be rolled, folded and otherwise manipulated by bakers engaged in the production of pastry items and the like, their work being done at work tables that can accommodate several workmen at a time, any one of whom requires the aid of a power roller at some stage of his work.

My invention relates especially to an improved dough handling apparatus of that general type, and more especially to an improved mechanism arranged and adapted to operate a single roller and to easily transfer that roller from one table to another, or make the roller available to any of several operators at a single table.

In addition, my improvement provides for vertical adjustment of the roller to suit different thicknesses of rolling, the adjustment for thickness being readily changed to suit the conditions at each new location.

My improvement also embodies means for quickly lifting the roller at any stage of its operation, or at any location in which it may be working, so that in case of emergency the touch of a button will cause the roller to rise up from the work table and release anything that may have gotten accidentally caught under it.

Such machines as are now being used for rolling purposes have not been entirely satisfactory in meeting the above requirements for the following reasons:

It has been proposed to provide means with central power units and a number, usually two or three, of roll-actuating devices operatively connected to the power for the purpose of rolling a dough piece on one table and then passing it through other rolls at right angles to a previous roller. But in such devices each table had its own roller that was adapted to operate continuously as a quantity production machine, and not for miscellaneous bakery uses, as is the mechanism described herein.

Such proposals have not actually accomplished the results desired, because there was no way of shifting a single roller from one conveyor table to another, or from a place on one table to other places on the same table, and there was no means for accurately adjusting the thickness of rolling wherever the roller might be located; nor was there included any automatic safety device for lifting the roller in case of an emergency, wherever the roller might be situated.

The object of my invention is to provide a novel means for actuating a sheeting roller by shifting, adjusting, and releasing it, in case of emergency; thus overcoming the deficiencies of the prior art.

In general, the manner in which my new dough working equipment corrects such prior deficiencies and operates more effectively to produce more and better work, is as follows:

I employ two conveyors, or dough working tables, arranged side by side and spaced apart. Between them is mechanism furnishing power for operating the conveyor tables and also for manipulating a single sheeting roll so that it can be transferred bodily, in the direction of its own length, from any position over one of the tables to any position over the other table; or shifted to different positions on the same table, so a worker at either position can operate it. The novel means for accomplishing that result is found in the way the roller is mounted and in arranging it with reference to the power source so the shift from one such position of the roller to another can be made manually without disconnecting the roller-drive mechanism or the motor of power source.

The idea, in general, is to make the supporting device for the roller in a series of telescopically arranged frames one above the other, so that when the frames are drawn out in one direction they carry the dough sheeting roller in the direction of its length crosswise of the machine and stop it over one of the work tables. Then, if the other table is to be served by the roller, the telescopic frame is extended in the opposite direction until the roller is placed over the other table. A floating train of gears that operatively connects the motor with the roller operates in the telescopic frame assembly while the frames are being slid sidewise to carry the roller from one table over to the other. When the roller is over either one of the two tables it can be shifted transversely of that table, and also lengthwise of both tables, or back-and-forth to any desired position, almost as easily as a flat-iron can be handled on an ironing table.

The above general description makes it evident that the contribution made by my invention now to be explained in detail is in the nature of a general utility apparatus especially adapted to meet the requirements of bakeries engaged in co-operatively producing a variety of dough products such as are usually made by individual workers engaged on the same item, or on different items, or on different parts of the same item. For instance, one operator may be engaged in sheeting dough pieces by hand on one of the traveling tables, and the other may be using the sheeting roller on the other table, or the roller can be midway between the two tables while both tables are being used for hand sheeting; say, one for cake dough and the other for bread dough; or any other combination of requirements can be served.

I have thus provided a sheeter installation of considerable capacity that enables two or more operators to use the dough tables for simultaneously working two or more kinds of dough. It enables the sheeting roll to be shifted from one worker to another as circumstances of production require.

From the foregoing it will be seen that the objects of my invention may be briefly set forth as follows:

To provide a dough roller equipment adapted to serve one or more work conveyor tables by a single roller that can be shifted quickly from working position over one table to working position over the other; to provide additional means enabling the roller to be placed at any working location along the effective length of either table; to provide a telescopic arrangement of supporting frames for the roller to accommodate the lateral shifting of the roller from one table to the other, and also to stow the roller, when not in use, between the two tables; so it will not interfere with manual use of either table; to provide a novel mounting for the dough piece roller and its telescopic frames and its power drive mechanism, and also to provide means for supporting and guiding both the roller and power drive during their shifting movements lengthwise of the two tables; to provide an emergency roll-lifting means controlled by safety mechanism that is mounted on and travels with the roller and the power means; to provide gauging means whereby the operator, while raising or lowering the roller to accommodate the desired thickness of sheeting, can observe on a visual gauge the exact setting of his thickness adjustment.

With the above and certain other objects in view, which will appear later in the specifications, my invention comprises the devices described and claimed and the equivalents thereof, and illustrated in the accompanying drawings.

Fig. 2 is a similar plan view;

Fig. 3 is an end view;

Fig. 4 is an enlarged sectional detail of the safety release lever and its connections;

Fig. 5 is an enlarged detail of the telescopic joints between the sliding frames that together carry the sheeting roller, and permit it to be shifted from side to side;

Figs. 6, 7, and 8 are diagrammatic views showing, respectively, the arrangement of sliding frames when the roller is over the left-hand work table, over the middle or neutral position, and over the right-hand work table.

Figure 15:
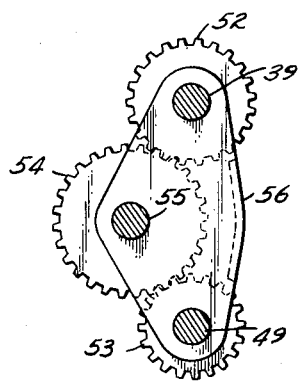
Figure 16:
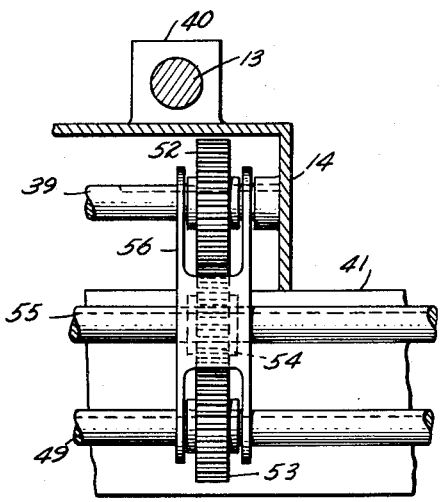
Figure 13:
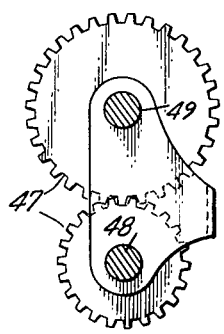
Figure 14:
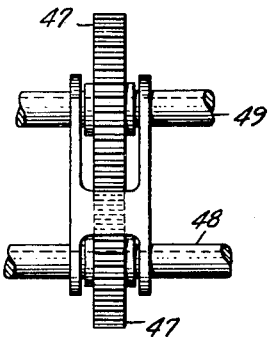
Figure 11:
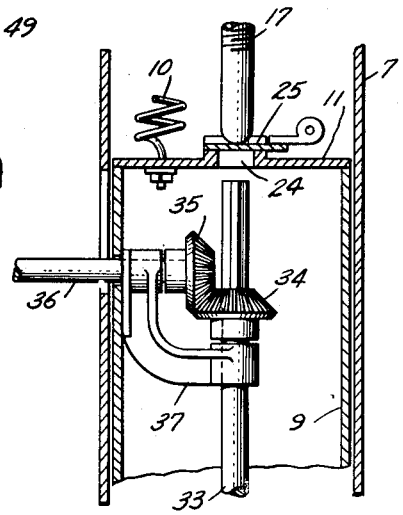
Figure 12:
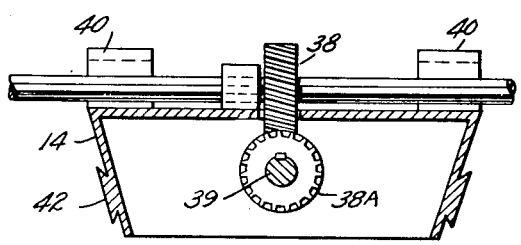

Fig. 9 is a part diagrammatic end view of the telescopic frames and the sheeting roller, showing also the general arrangement of the floating and sliding gear system that connects the motor operatively with the sheeting roll;

Fig. 10 is a diagrammatic central vertical section on line 10—10 of Fig. 9;

Fig. 11 is an enlarged fragmentary vertical sectional view of the upper end of one of the sliding tubes;

Fig. 12 is a vertical section through the upper movable frame;

Figs. 13 and 14 are, respectively, a side view and a front view of the set of sliding gears that drive the sheeting roll; and Figs. 15 and 16 are, respectively, a side view and a front view of the upper train of gears.

I provide a framework 1 mounted on casters and constructed so that it can be used either for a single or a double table installation. The two-table arrangement is shown in the drawings.

On the framework are spaced dough working tables 2 that have their outer edges turned up to form a trough, in which a conveyor belt 3 operates. The belts run over end pulleys 4, 5 and each is driven by pulley 4. Pulley 5 is provided with adjustable bearings to take up slack. In the top horizontal rail of the framework are mounted two idler rolls 6, beneath the upper run of the belt.

The idler rolls 6 are allowed to contact belt 3, for the purpose of holding the belt firmly in place when the sheeting roll is directly over it, thereby assuring that the dough to be processed is rolled to the desired thickness.

Figure 1:
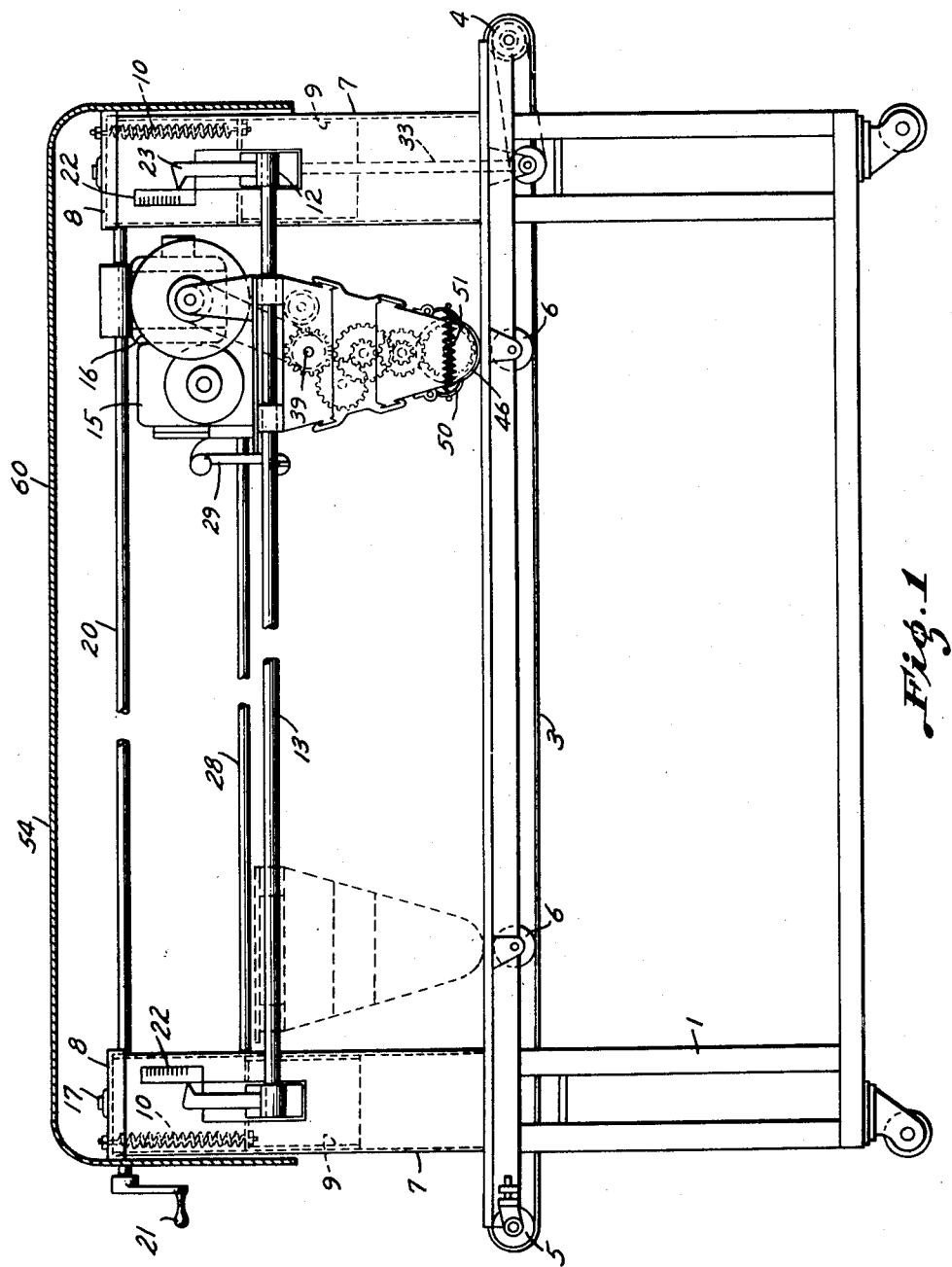
Fig. 1 is a part-diagrammatic part sectional side elevation of a machine embodying my invention in preferred form.

At each end of the machine, in the space between the tables, Figs. 1, 2, 3, is an upright housing 7 supported on framework 1. The housing is shown as a tube, Fig. 11.

Numeral 8 designates a cover on the upper end of the housing above the tables, as shown in Fig. 1. A short vertically movable slider, such as a slotted tube 9 is received inside of each housing tube 7. Tube 9 is suspended from cover 8 by tension members such as springs 10 that normally tend to lift the slider 9 and all of the mechanisms that are supported by it, as will be described later.

Numeral 11 designates a cover on tube 9 and the lower ends of springs 10 are secured to this cover, as shown in Fig. 4. The springs 10 are adapted to raise the sliding tube 9 about 3-inches if in case of emergency it should suddenly be required to raise the sheeting roller, as in the event that some foreign object were caught under the roller.

On each side of tube 9 is a bracket or bearing 12, Figs. 1 and 3, that projects through an opening provided in the wall of outer tubular wall 7. In these brackets 12 are secured ends of horizontal guide elements such as ways 13, 13 that are spaced apart and support a slidable framework or platform 14.

On 14 a power driving means such as reversible motor 15 and a reducing gear 16 are mounted, as also are the dough sheeting roll and its cooperating assembly of mechanisms.

The slidable tubes 9 also function as controls for adjusting the thickness of sheeted dough pieces on tables 2. They are provided with manual means for adjustment up and down, such as screw rods 17, to which spiral gear nuts 18, Fig. 3, are attached. Nut 18 is driven by a spiral gear 19 on a rotatable shaft 20 that extends lengthwise of the machine and terminates at a crank 21. Turning the crank raises or lowers the bottom end of both screw rods 17.

To indicate to the user the vertical position of slidable tubes 9, a graduated gauge 22, Fig. 1, is attached to tube 7 and a pointer 23 is mounted on the sliding tube 9. Each sliding tube 9 has a cover 11 provided with an opening 24, Fig. 4. The opening normally is kept closed by a flat slider 25 on the cover 11. When rod 17 is screwed downward by crank 21 it engages the slider 25 as a stop that keeps tube 9 from rising. The two tubes 9 carry the weight to the power source such as the motor and reduction gear and also carry the sheeting roller and its supports and lateral shifting devices.

Flat slider 25 is operated by a link 26, Fig. 4, attached to arm 27 of a cam shaft 28. The shaft 28 is carried on the bearing brackets 12, at opposite ends of the machine, as shown in Figs. 1, 2, and 4. It extends lengthwise of the machine between the housings 7, 7. Shaft 28 is also provided throughout its length with a featherway and carries the double ended upright lever 29, by which the slide 25 can be moved from underneath the end of screw rod 17 when necessary in case of emergency. This can be done by pushing on either one of the buttons 29a or 29b.

Referring to Figs. 2 and 3, the belt pulley 4 of the left-hand conveyor table is driven by a chain from a shaft 30 which is operated, by a mitre gear 31, through a clutch 32 that permits belt 3 to be stopped suddenly when desired. Mitre gear 31 is driven by another gear at the lower end of upright shaft 33, in Figs. 1 and 3. At the upper end of shaft 33 is another mitre gear 34 driven by a similar gear 35 on the shaft 36, Figs. 2 and 11, which is carried by the sliding tubes 9 and has a full length featherway so it can be driven from any position in which the movable frame 14 happens to be—for example, the dotted line position indicated in Fig. 1.

Shaft 36 is driven by a slidable spiral gear 38, which is in turn driven by another spiral gear 38a (Figs. 8 and 12) on the shaft 39 in the top frame 14. Shaft 39 is driven by a chain from the reducer 16, as shown in Figs. 1 and 6.

Shaft 36 is extended into slider 9 through an opening in tube 7, being carried in a bearing member 37 that is bolted inside the slider and has a gear 35 keyed to its outer end. Gear 35 drives gear 34 on the upright shaft 33. The upper end of 33 is extended to a sufficient height to permit gear 34 to rise when slider 9 is raised by the springs 10, thus permitting continuous operation of the traveling belts 3 regardless of the vertical position of roll 46, as in Fig. 11.

The top movable frame 14 slides on tubes 13, 13 and is provided with four ears 40, Figs. 6, 7, 8, and is provided with four ears 40, Figs. 6, 7, 8, that support the middle sliding frame 41 by means of the dovetail sliding connections 42, as shown in Figs. 5 and 9.

The middle sliding frame 41, which is much longer than frames 14 or 45, also carries the upper and lower hook-shaped members 44 and 44a, and the upper member 44 slides on 42. The lower members 44a carry the lowermost sliding frame 45, by means of the sliding connections 43.

The purpose of such arrangement of the slides is to permit the lowermost frame 45 to be extended, Fig. 6, over the traveling belt 3. Frame 45 is provided with a sheeting roll 46. The sheeting roll is driven from shaft 39 in frame 14 through a train of gears 47, 47, Figs. 13 and 14, that are housed in frames 41 and 45 to slide on shafts 48 and 49, Figs. 3, 13 and 14.

On shaft 49 is placed the upper sliding gear 47, which drives a similar gear on shaft 48, the floating gears being housed in a frame so they move together when the sliding frames 41 and 45 are extended in either direction. The roll 46 is driven by gears as shown in Figs. 6, 7, 8, from shaft 48.

Roll 46 has scraper blades 50 at each side, connected by a spring 51 to keep the sheeting roller surface clean.

The floating drive for the sheeting roll is shown in Figs. 15 and 16, and consists of a gear 52 keyed on shaft 39 which drives gear 53 on shaft 49 through the idler gear 54 on shaft 55, these gears being held in line by the yoke 56. Shafts 49 and 55 have featherways full length and are housed in the sliding frame 41 and slide through gears 53 and 54 when member 41 is extended in either direction.

The frame 14 and the sliding frames 41 and 45 can be moved lengthwise of the machine by means of a rack 57 and spur gear 58, Fig. 10, mounted in frame 14. This gear 58 is driven by a chain from the reducer gear 16 and may be provided with a clutch 59 by which it can be stopped when necessary.

When the machine is arranged to serve two belts, as illustrated herein, the belt pulley on the right-hand side, Fig. 3, is driven by a chain from an extension of shaft 30, which may have a clutch by which the belt can be stopped. The upper part of the machine may be enclosed by a metal cover 60, secured to the upright housing tubes 7.

The operation of the machine is as follows:

When the left-hand table, Figs. 2, 3, and 6, is in use the sliding frames 41 and 45 are extended as shown. The roll 46 is then directly over belt 3 and revolves in the same direction as the belt travel and at the same peripheral speed. The dough passes between them and is rolled to any desired thickness shown by the gauge 22. After the dough has been rolled the sliding frames 41 and 45 are shifted to the right to bring their outer ends in line (Fig. 7) and the working width of the belt 3 is left free of obstructions.

When the right-hand belt is used, the sliding frames are moved to the position shown in Fig. 8. Roll 46 is then directly over the right-hand belt and the dough can be rolled as on the left-hand belt.

The flat slider 25 over hole 24 in cover 11 on the sliding tube 9, and also the link 26, the arm 27, shaft 28, and the double arm 29 are provided in case an operator should get his hand caught between the roll 46 and the traveling belt 3. In that event he can push a rod or button 29a or 29b operatively connected to arm 29, thereby releasing slide 25 from under the screw rod 17. The extension springs 10 will instantly lift the sliding tubes 9, along with the entire drive mechanism, and the lower slide frame 45 with roll 46, to a height of about 3 inches from the belt, and hold it up. Screws 17 can then be raised by the crank 21, Fig. 1, to a sufficient height to permit the slide 25 to be moved back to its original position over the opening 24 in cover 11 on tube 9. Then the screws 17 can be operated in the opposite direction by means of crank 21, Figs. 1 and 2, and can force the drive mechanism and roller 46 down to operating position at the desired thickness.

Having thus described my invention, what I claim and desire to secure by Letters Patent is:

1. Dough working mechanism of the character described comprising work tables spaced apart; housings situated at the ends of the tables and projecting higher than the tables; sliders movable vertically in said housing; tension members connecting the tops of said sliders with the tops of their housings and adapted to exert continually force sufficient to lift the slider and the mechanisms carried thereby; horizontal guideways connecting the respective sliders movable up and down with the sliders as a unitary horizontal framework; a platform mounted on said guideways for movement lengthwise thereof; reversible power means carried on said platform; slidingly joined frames suspended from the platform one below the other and connected telescopically for lengthwise extension transversely of the table; a dough sheeting roller power driven and operated in the lowermost frame; manually adjustable means at the top of each housing positioned normally for keeping the slider from being moved upward by said tension members; a safety mechanism comprising a release member and operative connections therefor adapted to move by manual actuation the said adjustable means.

2. Dough working mechanism of the character described comprising work tables spaced apart; housings situated at the ends of the tables and projecting higher than the tables; sliders vertically movable in said housing; horizontal guideways connecting the respective sliders and movable up and down therewith as a unitary horizontal framework; adjustable means on each housing situated in the path of upward movement of said sliders and presenting a limit stop thereto; safety mechanism manually operated and adapted to move said abutment means from the path of the slider; lifting means attached to said slider having strength appropriate to exert continuous effort on said slider to raise it together with said horizontal framework; roller operating and guiding mechanism supported therefrom; a platform movable lengthwise of said framework; power means on said platform; a sheeting roller with operative connections to said power means; roller supporting devices depending from said platform one below the other with connections telescopically movable transversely of the said work tables.

HOWARD F. WHITE.

No references cited.